United States Patent [19]

Hrusecky et al.

[11] Patent Number: 5,375,078
[45] Date of Patent: Dec. 20, 1994

[54] ARITHMETIC UNIT FOR PERFORMING XY+B OPERATION

[75] Inventors: David A. Hrusecky, Johnson City; Michael Putrino, Endwell, both of N.Y.

[73] Assignee: International Business Machines Corporation, Armonk, N.Y.

[21] Appl. No.: 991,052

[22] Filed: Dec. 15, 1992

[51] Int. Cl.$^5$ ............................................. G06F 7/38
[52] U.S. Cl. .................................... 364/736; 364/748
[58] Field of Search .................. 364/736, 748, 715.04, 364/745

[56] References Cited

U.S. PATENT DOCUMENTS

| | | | |
|---|---|---|---|
| 3,987,291 | 10/1976 | Gooding et al. | 364/787 |
| 4,511,990 | 4/1985 | Hagiwara et al. | 364/748 |
| 4,592,006 | 5/1986 | Hagiwara et al. | 364/748 |
| 4,594,678 | 6/1986 | Uhlenhoff | 364/736 |
| 4,831,577 | 5/1989 | Wei et al. | 364/757 |
| 4,852,037 | 7/1989 | Aoki | 364/736 |
| 4,866,652 | 9/1989 | Chu et al. | 364/748 |
| 4,969,118 | 11/1990 | Montoye et al. | 364/748 |
| 5,070,471 | 12/1991 | Dao-Trong et al. | 364/760 |
| 5,113,363 | 5/1992 | Orsino et al. | 364/736 |
| 5,119,324 | 6/1992 | Ahsan | 364/736 |
| 5,241,490 | 8/1993 | Poor | 364/715.04 |

OTHER PUBLICATIONS

IEEE Transactions on Computers, vol. 40, No. 11, Nov., 1991, "Hard-Wired Multipliers With Encoded Partial Products", by S. Vassiliadis et al.

*Primary Examiner*—Tan V. Mai
*Attorney, Agent, or Firm*—Arthur J. Samodovitz

[57] ABSTRACT

An arithmetic unit rapidly performs an XY+B floating point operation and yields a result equivalent to truncation of the product of X and Y before adding to B. Standard circuitry produces partial products from multiplier X and multiplicand Y, and a standard adder adds the partial products to yield a sum vector and a carry vector. Meanwhile, other circuitry predicts whether a most significant digit of a sum of the sum vector and the carry vector is zero or nonzero, based on less than all bits of the multiplier X and the multiplicand Y. If the most significant digit is certainly not equal to zero, a multiplexing circuit passes to a second adder a most significant N digits of the sum vector, a most significant N digits of the carry vector, a carry bit resulting from addition an (N−1)th most significant digit and lesser significant digits of the sum vector with an (N+1)th most significant digit and less significant digits of the carry vector, and an operand B. If the most significant digit is certainly equal to zero, then the multiplexing circuitry passes to the second adder a most significant N+1 digits of the sum vector, a most significant N+1 digits of the carry vector, a carry bit resulting from the addition of an (N+2)th most significant digit and less significant digits of the sum vector with an (N+2)th most significant digit and lesser significant digits of the carry vector, and the operand B.

21 Claims, 10 Drawing Sheets

ARITHMETIC UNIT FOR PERFORMING XY+B OPERATION

BACKGROUND OF THE INVENTION

The invention relates generally to computer hardware, and deals more particularly with circuitry for rapidly performing an XY+B operation with floating point format.

Most computer systems include electronic circuitry/hardware for performing arithmetic operations such as multiplication, division, addition and subtraction. Often times, the computer systems use a floating point format in which each number participating in or resulting from the arithmetic operation is represented by a mantissa, radix and exponent. The mantissa is a set of digits preceded by a decimal point (such that the mantissa is less than one). The radix is the base of the number, and the exponent is the power of the base. For example, the floating point representation for binary 100.1 is $0.1001 \times 2$ to the power of 3 where "0.1001" is the mantissa, "2" is the radix and "3" is the exponent.

One known technique for performing the function XY+B is to first perform the multiplication XY and then add the result to B. The multiplication can be divided into four phases. In the first phase, each digit of the multiplier is multiplied with the complete multiplicand to yield partial products which are grouped into a matrix. To expedite this phase, well known Booth encoders can be used to combine some of the multipliers together to reduce the number of partial products. Next, the partial products within the matrix are added together to yield a sum vector and a carry vector. This addition can be expedited by the well known Wallace tree or the circuitry illustrated in FIG. 3 of U.S. Pat. No. 4,969,118. Next, the sum and carry vectors are added together in a two-to-one adder. Finally, the output of the two-to-one adder is normalized, i.e. any leading zero digits in the mantissa are omitted, the first non-zero digit in the mantissa is positioned to the immediate right of the decimal point and the exponent is adjusted accordingly. Then, "B" is shifted left or right such that the resultant exponent of B equals the exponent of the normalized result of the multiplication, and the normalized result is added to B in another two-to-one adder. Finally, the result of this other two-to-one adder is normalized, and excess digits are truncated to the limits of the architecture to yield the final result. While this technique is effective in performing the XY+B function and provides maximum precision, it is slow because all steps are performed serially.

U.S. Pat. No. 4,969,118 discloses a faster circuit for performing the XY+B function in which the foregoing circuitry also generates the partial product matrix. However, while this is occurring, other circuitry within U.S. Pat. No. 4,969,118 calculates the required shifting of "B". Then, the shifted B is added with the partial products of the matrix. This technique is faster than the previously described serial process because the requisite shifting is calculated and implemented in parallel with the partial product generation instead of serially. Also, the addition of the shifted B with the partial products minimally adds to the duration of this addition step yet avoids the final addition step. Next, the sum and carry vectors which result from the summation of the partial products are added together in a two-to-one adder. Finally, the result of the two-to-one adder is normalized and truncated.

As noted above, both of the foregoing techniques for performing the XY+B function conclude with normalization and then truncation of excess digits, and provide maximum precision. For example, if the architecture supports a maximum of 6 hexadecimal digits or 24 binary bits (IBM ES/390 tm "short" precision), then the product of XY can be up to 12 hexadecimal digits. Because B is added to the result of the multiplication before the truncation, all digits resulting from the multiplication are considered in the addition of XY with B, and the final result is accurate to 6 hexadecimal digits.

In a prior art IBM System/390 architecture and other prior art architectures, the foregoing four multiplication steps are performed serially and then the B operand is added to the result of the multiplication. However, unlike the foregoing process, the result of the multiplication is truncated before the B operand is added. Consequently, if the architecture supports 6 hexadecimal digits and the shifted B operand comprises a non-zero digit in the 7th position which is as significant as the most significant digit in the 7th position truncated from the result of the multiplication before addition with the B operand, then the accuracy of the final result may be only 5 digits. This is because the 7th position digit from the result of the multiplication, if not truncated, when added to the B operand could effect the 6th digit. Nevertheless, 5 hexadecimal digits of accuracy are plenty for the vast majority of applications, and the truncation of the result of the multiplication before addition greatly simplifies the hardware.

A general object of the present invention is to provide circuitry which performs an XY+B function more rapidly than the prior art IBM System/390 architecture but yields an identical result.

SUMMARY OF THE INVENTION

The invention resides in an arithmetic unit for rapidly performing an XY+B floating point operation and yielding a result equivalent to normalization and truncation of the product of X and Y before adding to B. The arithmetic unit comprises standard circuitry for producing partial products from multiplier X and multiplicand Y, and a standard adder for adding the partial products to yield a sum vector and a carry vector. According to the present invention, while the aforesaid circuitry produces the partial products and/or the adder adds the partial products, other circuitry predicts whether a most significant digit of a sum of the sum vector and the carry vector is zero or non-zero, based on a plurality of bits of the multiplier X and the multiplicand Y. If this prediction can be made with certainty, then the time saving technique of the present invention can be used. Accordingly, the present invention also includes a second adder and multiplexing circuitry. The multiplexing circuitry is coupled and responsive to the prediction circuitry, for passing appropriate inputs to the second adder. If the prediction circuitry predicts with certainty that the most significant digit of the sum of the sum vector and the carry vector is not equal to zero, the multiplexing circuitry passes a most significant N digits of the sum vector, a most significant N digits of the carry vector, a carry bit resulting from addition of an (N+1)th most significant digit and lesser significant digits of the sum vector with an (N+1)th most significant digit and less significant digits of the carry vector, and an operand B to the second adder. If the prediction circuitry predicts with certainty that the most significant digit of the sum of the sum vector and the carry vector is equal to zero, then the multiplexing circuitry passes a most significant N+1 digits of the sum vector, a most significant N+1 digits of the carry vector, a carry bit resulting from addition of an (N+2)th most significant digit and less significant digits of the sum vector with an (N+2)th most significant digit and lesser significant digits of the carry vector, and the operand B to the second adder.

In some cases the prediction circuitry cannot make the prediction with certainty. This is due to the following. In order to provide the prediction before the partial product producing circuitry and the first adder complete their operations, the prediction circuitry bases the prediction on less than all bits of multiplier X and less than all bits of multiplicand Y. Consequently, the prediction circuitry cannot predict with certainty for some combinations of multipliers X and multiplicands Y whose sum of the respective sum vector and carry vector is approximately equal to hexadecimal one whether the most significant digit of the sum of the sum vector and the carry vector is zero or non-zero. In such cases, the prediction and multiplexing circuitry inhibits the passing of any digits of the sum vector and carry vector to the second adder. Instead the sum and carry vectors are added in the traditional manner in a third adder and then normalized and truncated and added with the operand B.

DETAILED DESCRIPTION OF THE PREFERRED EMBODIMENTS

Figure 1:
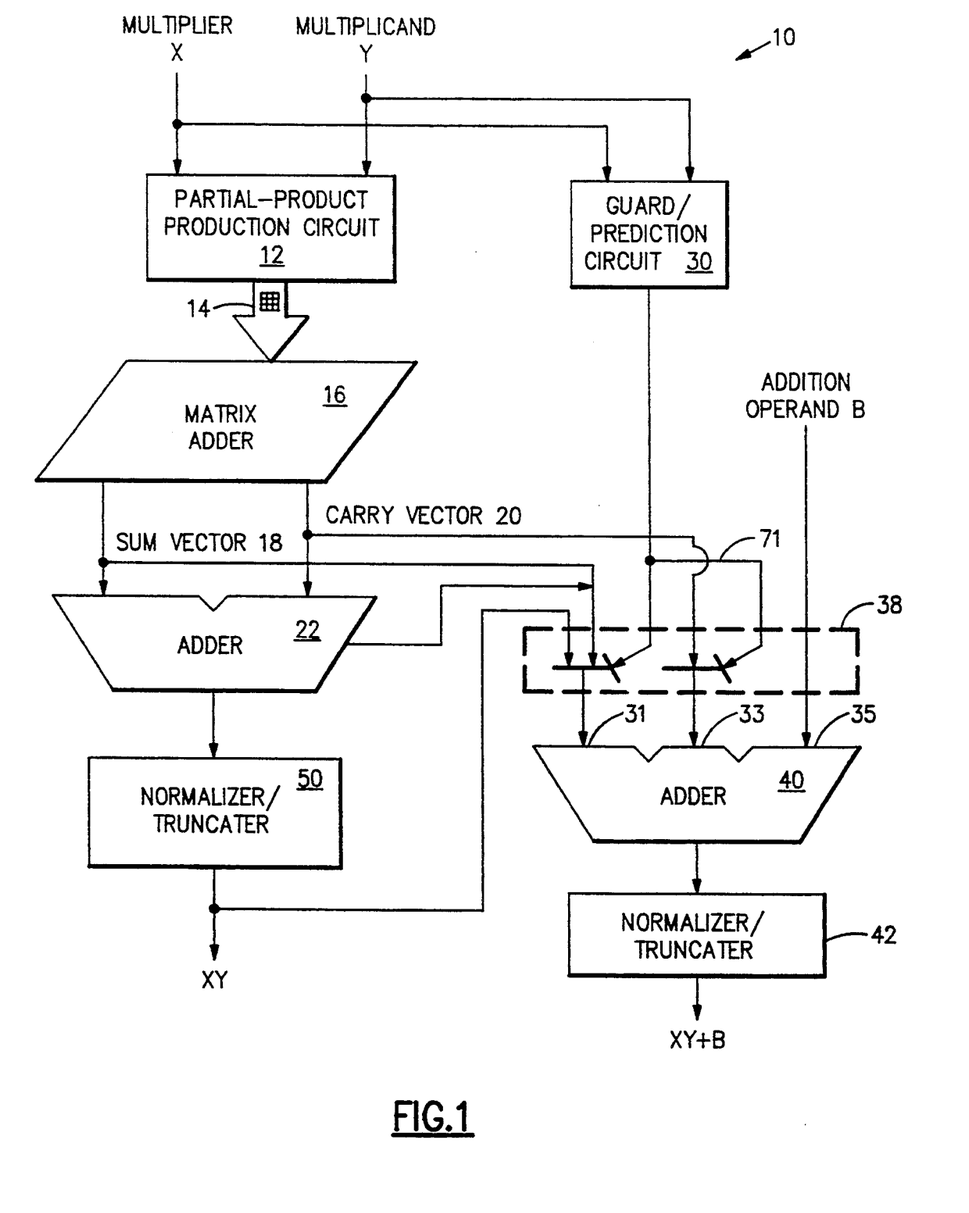
FIG. 1 is a block diagram of an arithmetic unit according to the present invention.

Referring now to the figures in detail wherein like reference numerals indicate like elements throughout the several views, FIG. 1 illustrates an arithmetic unit generally designated 10 according to the present invention. Arithmetic unit 10 performs an XY+B operation where X, Y and B are floating point numbers and X and Y are normalized. By way of example, each of X, Y and B comprises 6 hexadecimal digits. (Each hexadecimal digit represents 4 bits.) Arithmetic unit 10 comprises circuitry 12 which produces a matrix 14 of partial products from multiplier X and multiplicand Y. Such circuitry 12 is well known in the art and writes in the matrix a copy of the multiplicand for each "1" bit of the multiplier; however, each copy is shifted left a number of bits based on the power of the respective "1" bit of the multiplier. Thus, bits of equal significance are aligned with each other. Such circuitry is described in "Hard-Wired Multipliers with Encoded Partial Products" by Vassiliadis et al. IEEE Transactions in Computing, Vol. 40, No. 11, November 1991. Alternately, circuitry 12 comprises more sophisticated Booth encoders to reduce the number of elements in the matrix as described in U.S. Pat. No. 5,070,471 and EP 129,039 B1. These two patents are hereby incorporated by reference as part of the present disclosure.

Arithmetic unit 10 also comprises a matrix adder 16 to add the partial products of the matrix 14. Such an adder 16 is also well known in the art and can be that of FIG. 3 of U.S. Pat. No. 4,969,118 (which is hereby incorporated by reference as part of the present disclosure) or utilize a well known Wallace tree as described in "A Suggestion for a Fast Multiplier." by C. S. Wallace, IEEE Transactions in Electronic Computing, Vol. EC-13, pages 14–17, Feb. 1964. The result of the adder 16 is a sum vector 18 and a carry vector 20. If multiplier X and multiplicand Y each comprise 6 hexadecimal digits, then the sum vector 18 and carry vector 20 each comprise 12 hexadecimal digits. Next, the sum and carry vectors 18 and 20 are added together in a two-to-one adder 22. This is done for two reasons. As described below, the time saving technique of the present invention can be used for the vast majority of combinations of multipliers and multiplicands, but there are some combinations where it cannot be used. If the time saving technique of the present invention can be utilized, an intermediary result of the two-to-one adder generates a carry bit which is used as described below. However, if the time saving technique of the present invention cannot be utilized, then the final result of the two-one adder, after normalization and truncation is added to the operand B as in the prior art.

According to the present invention, while circuit 12 generates the partial product matrix 14 and adder 16 adds the partial products of the matrix, a guard/prediction circuit 30 determines if the time saving technique of the present invention can be utilized. This determination is based on the following. The time saving technique of the present invention can only be utilized if the guard/prediction circuit 30 can predict with certainty the nature of the leading hexadecimal digit resulting from the addition of the sum vector 18 and carry vector 20, i.e. would the leading hexadecimal digit be zero or non-zero. This is important because this effects the number of digits of the sum and carry vectors 18 and 20 and the proper carry from adder 22 required to be added in an adder 40. If the leading hexadecimal digit would certainly be zero, then an extra sum vector digit, an extra carry vector digit and a respective carry digit from adder 22 must be added in adder 40 to yield the same result as if the prior art IBM System/390 arithmetic unit were utilized. If the leading hexadecimal digit would certainly be non-zero, then one less sum vector digit, one less carry vector digit and a respective carry digit from adder 22 must be added in adder 40 to yield the same result as if the prior art IBM System/390 arithmetic unit were utilized. In either of these two certain cases, the time saving technique of the present invention can be utilized. However, if the guard/prediction circuit 30 cannot predict with certainty that the leading hexadecimal digit of the sum of the sum vector 18 and carry vector 20 would be zero or would be non-zero, then the time saving technique of the present invention cannot be utilized and the final result of the two-to-one adder 22, after normalization and truncation is added to the operand B as in the prior art.

Figure 6:
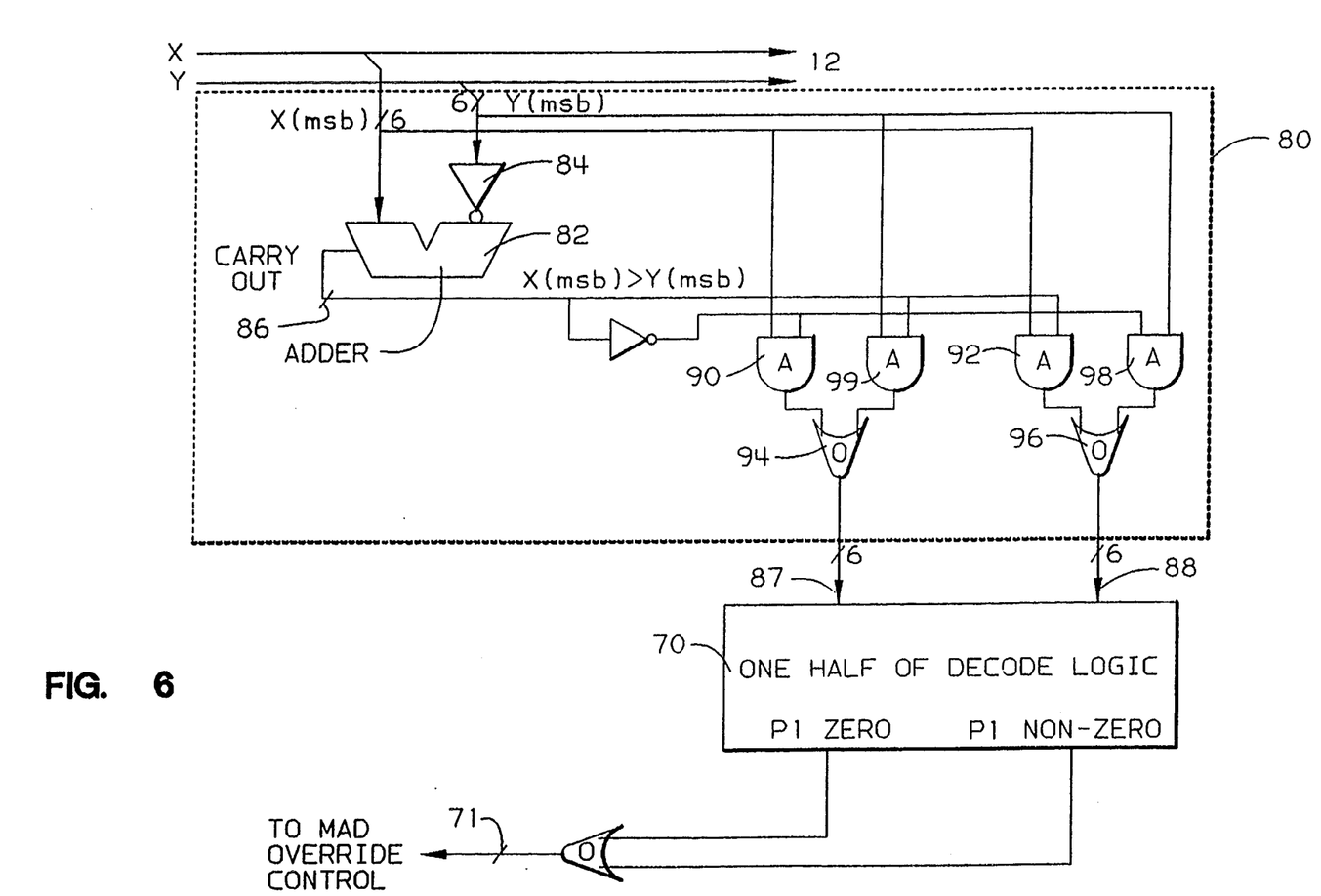
FIG. 6 is a diagram of X and Y interchange circuitry and a block diagram of decode logic within the guard/prediction circuit.

The guard/prediction circuit 30 predicts the nature of the leading digit of the sum of the sum vector 18 and carry vector 20 by estimating the result of XY. The estimation is based on only 6 bits, the most significant, of each of X and Y so that the decoding logic 70 (FIG. 6) can complete its analysis before adder 16 completes the addition of the partial product matrix. However, when the estimate is near the boundary between a hexadecimal zero leading digit and a hexadecimal non-zero leading digit, i.e. when the estimate is approximately hexadecimal one, then the estimate is indeterminate and the time saving technique of the present invention cannot be utilized. In such a case, the guard/prediction circuit 30 inhibits the sum vector 18, carry vector 20 and respective carry bit from being passed to the adder 40. Instead, the adder 40 receives the subsequent output from normalizer 50 after the sum and carry vectors are completely added in adder 22.

As noted above, the result of arithmetic unit 10 according to the present invention should mimic the output of the prior art IBM System/390 arithmetic unit which truncates the product of X and Y before adding to the B operand. Therefore, the arithmetic unit 10 should not introduce all of the least significant digits of the sum and carry vectors into the adder 40 (even though these least significant digits add to the precision). Assuming guard/prediction circuit 30 predicts the leading digit with certainty to be zero or to be non-zero, guard/prediction circuit 30 also determines which digits of the sum and carry vectors and which intermediate carry from adder 22 to pass to adder 40 to add with operand B. If the time saving technique can be utilized, regardless of whether the prediction is zero or non-zero, the first 6 digits of the sum vector 18 are always passed to input 31 of adder 40 (via switching and alignment circuitry 38), and the first 6 digits of carry vector 20 are always passed to input 33 of adder 42 (via circuitry 38). However, if the guard/prediction circuit 30 predicts the leading hexadecimal digit of the sum of the sum vector 18 and carry vector 20 to be zero, guard/estimation circuit 30 also passes the 7th digit of sum vector 18 and the carry bit from the 8th to the 7th digit from adder 22 to input 31 of adder 40 (via circuitry 38) and passes the 7th digit from carry vector 20 to input 33 of adder 40 (via circuitry 38). If the guard/prediction circuit 30 predicts the leading hexadecimal digit of the sum of the sum vector 18 and carry vector 20 to be non-zero, guard/estimation circuit 30 instead passes the carry bit from the 7th to the 6th digit from adder 22 to the input 31 of adder 40 (along with the first 6 digits of the sum vector and carry vector) (via circuitry 38). It should be noted that the requisite carry digit from two-to-one adder 22 is generated as an early step in the addition process, well before adder 22 completes the addition of sum vector 18 and carry vector 20. The operand B is also passed to another input 35 of adder 40 (via circuitry 38).

In the vast majority of cases the time saving technique of the present invention can be utilized, and adder 40 adds the relevant digits of the sum vector 18 and carry vector 20, operand B and proper carry bit from adder 22 without waiting for the adder 22 to complete the addition of the sum and carry vectors. This decreases computation time compared to the prior art IBM System/390 procedure. Then, a normalizer/truncater 42 normalizes the output from the adder 40 to position the most significant non-zero digit just to the right of the decimal point, adjusts the exponent accordingly and truncates the result after the 6th digit. In the few cases where the guard/prediction circuit 30 determines that the time saving technique cannot be utilized, the adder 22 must complete the addition of the sum vector 18 and carry vector 20, and then normalizer/truncater 50 normalizes and truncates the result, and adder 40 adds the result of normalizer/truncater 50 to the operand B. Note that the same adder 40 is used in both cases to minimize the amount of hardware.

The following is a more detailed description of the guard/prediction circuit 30. The guard/prediction circuit 30 determines whether the most significant hexadecimal digit (MSD) that would result from the sum of the sum and carry vectors (SSC) is zero, non-zero or indeterminate. For the MSD to be nonzero, the MSD must fall within the binary range:

$$0.0001000000000000000000000 \text{ to}$$
$$0.1111111111111111111111111$$

because this range is equivalent to hexadecimal range:

$$0.100000 \text{ to } .FFFFFF$$

For the MSD to be zero, the MSD must fall within the binary range:

$$0.0000000100000000000000000 \text{ to}$$
$$0.0000111111111111111111111$$

because this range is equivalent to hexadecimal range:

$$0.010000 \text{ to } .0FFFFF$$

Figure 2:
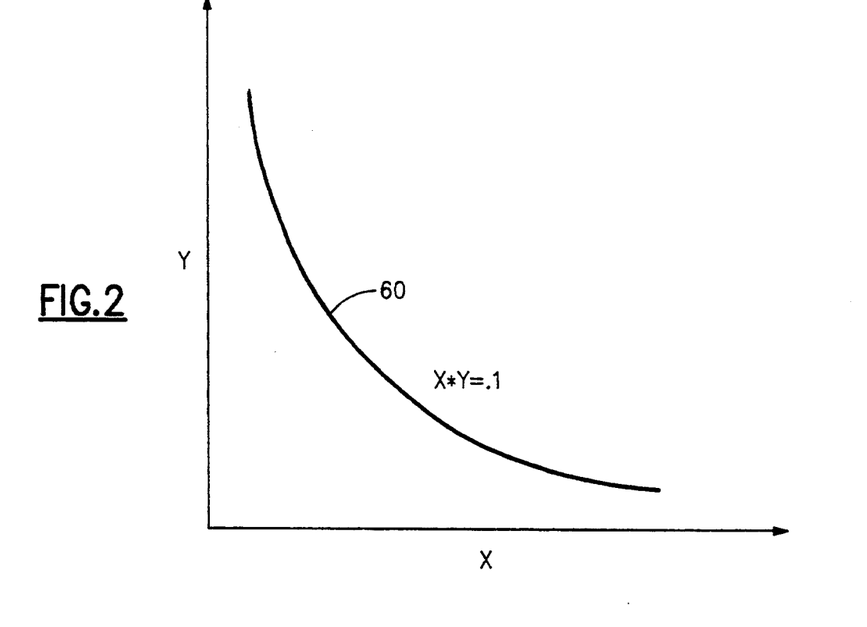
FIGS. 2–5 are graphs which explain operation of a guard/prediction circuit within the arithmetic unit of FIG. 1.

The SSCs of the boundary between these two ranges, i.e. the SSCs that equal hexadecimal 0.100000 ... with infinite precision are represented by a curve 60 of FIG. 2 as a function of multiplier X and multiplicand Y. If the SSC falls below the curve, then the MSD is zero. However, if the SSC falls on or above the curve, then the MSD is nonzero. Theoretically, in all instances where the SSC falls on or above the curve, then the first 6 digits of the sum and carry vectors and the 7th to 6th digit carry bit should be passed to the adder 40. Theoretically also, in all instances where the SSC falls below the curve, then the first 7 digits of the sum and carry vectors and the 8th to 7th digit carry bit should be passed to the adder 40. However, in order to precisely determine the SSC, all bits of the multiplier X and multiplicand Y must be considered, and this would take longer than required to produce the sum vector 18 and carry vector 20 and not save time as intended by the present invention or require an inordinate amount of decoding logic. Therefore, according to the present invention, only some (for example, six) of the most significant bits of the multiplier X and multiplicand Y are used to estimate XY (the SSC) and predict the MSD. This can be accomplished much faster and/or with less decoding logic than required to decode all digits of X and Y, and be completed before the sum and carry vectors are calculated as required to expedite the final result. However, because the SSC is estimated, if the estimate is on or near the curve 60, i.e. 0.1000 ..., then it is not known with certainty whether the MSD will be zero or nonzero. Consequently, in these cases the MSD is indeterminate, and the time saving technique of the present invention cannot be used. Instead, the sum and carry vectors in their entirety must be added completely in adder 22, and then the sum normalized, truncated and added to operand B as in the prior art.

It should be noted that the more bits of X and Y that the guard/prediction circuit 30 uses to estimate the SSC, the more precise the estimate of the SSC and the smaller the number of indeterminate cases, but the greater the time and/or decode logic required to make the prediction. Adder 40 cannot operate until the prediction is made. Conversely, the fewer the bits of X and Y that are used to estimate the SSC and predict the MSD, the less precise the estimate of the SSC and the greater the number of indeterminate cases, but the shorter the time and/or less decode logic required to make the estimate and prediction. However, as long as the time required to make the estimate and prediction is shorter than the time required by partial product hardware 12 and matrix adder 16 to complete their operation, then there is no delay to the addition of the operand B to the appropriate digits of the sum and carry vectors and carry bit.

Figure 3:
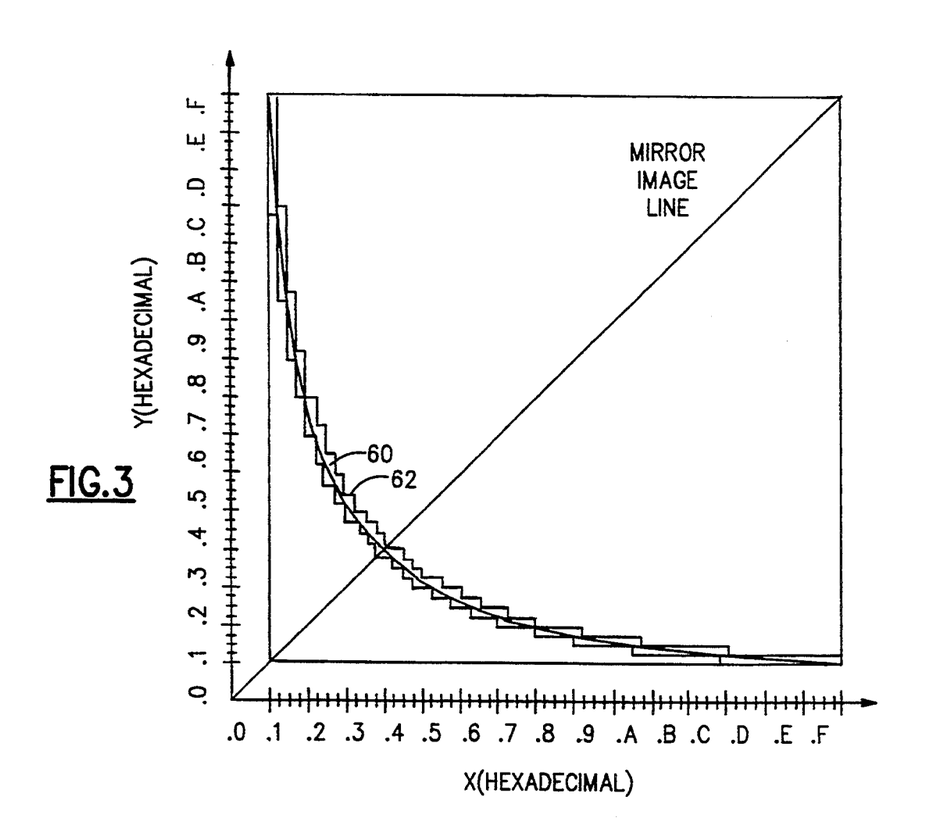

FIG. 3 illustrates an indeterminate region 62 about the curve 60 in the case where six bits of X and six bits of Y are used to estimate the SSC and predict the MSD in the short and long precision architecture. To predict the MSD, the six most significant bits of the multiplier X and multiplicand Y are supplied to decode circuitry 70 (FIG. 6) within the guard/prediction circuit 30. The decode circuitry 70 comprises digital logic which identifies those combinations of the 6 bits of X and the 6 bits of Y that result in an estimate of SSC below the region 62 and other digital logic which identifies those combinations of the 6 bits of X and the 6 bits of Y that result in an estimate of SSC above the region 62. If neither of the digital logic circuits is satisfied, then the estimate is indeterminate. These digital logic circuits within decoding logic 70 are represented precisely by the following logic equations:

| Logic Decoding MSD Equal Zero (below region 62) | | | | |
|---|---|---|---|---|
| Zone | X | | Y | |
| 1 | (.000100 | and | .110010) | or |
| 2 | (.000100 | and | .11000-) | or |
| 3 | (.000100 | and | .10---) | or  - = don't care |
| 4 | (.0001- | and | .1----) | or |
| 5 | (.000101 | and | .10100-) | or |
| 6 | (.000101 | and | .100--) | or |
| 7 | (.000110 | and | .1000--) | or |
| 8 | (.001000 | and | .01100-) | or |
| 9 | (.00100- | and | .010--) | or |
| 10 | (.00--- | and | .00---) | or |
| 11 | (.001001 | and | .011000) | or |
| 12 | (.001010 | and | .010110) | or |
| 13 | (.00101- | and | .01010-) | or |
| 14 | (.00101- | and | .0100--) | or |
| 15 | (.001011 | and | .010100) | or |
| 16 | (.001100 | and | .010010) | or |
| 17 | (.00110- | and | .01000-) | or |
| 18 | (.001110 | and | .010000) | |

Figure 4:
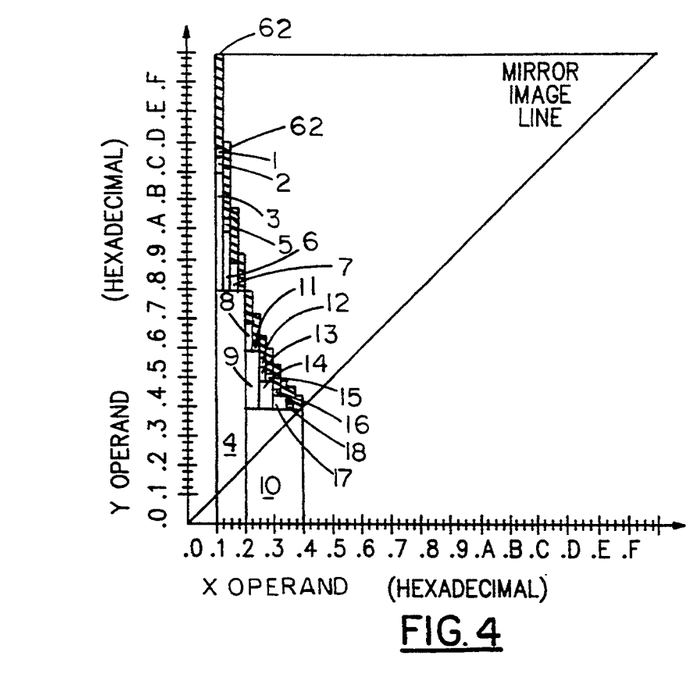

These logical equations are based on a logic map illustrated in FIG. 4. The indeterminate region 62 is divided into 12 non-overlapping rectangular regions. The region to the left and below the indeterminate region 62, i.e. where the prediction is zero for the SSC, is divided into 18 rectangular zones. The range of values for X and Y for each of these zones is defined by the respective condition with the foregoing set of logic.

| Logic Decoding MSD Not Equal to Zero (above region 62) | | | | |
|---|---|---|---|---|
| Zone | X | | Y | |
| 1 | (.000101 | and | .111--) | or |
| 2 | (.000101 | and | .1101--) | or |
| 3 | (.00011- | and | .11---) | or  - = don't care |
| 4 | (.000110 | and | .1011--) | or |
| 5 | (.000110 | and | .101011) | or |
| 6 | (.000111 | and | .101--) | or |
| 7 | (.000111 | and | .10011-) | or |
| 8 | (.000111 | and | .100101) | or |
| 9 | (.001--- | and | .1----) | or |
| 10 | (.001001 | and | .01111-) | or |
| 11 | (.001001 | and | .011101) | or |
| 12 | (.00101- | and | .0111--) | or |
| 13 | (.00101- | and | .01101-) | or |
| 14 | (.0011-- | and | .011--) | or |
| 15 | (.001011 | and | .01100-) | or |
| 16 | (.00110- | and | .01011-) | or |
| 17 | (.001100 | and | .01010-) | or |
| 18 | (.00111- | and | .0101--) | or |
| 19 | (.001110 | and | .010011) | or |
| 20 | (.001111 | and | .01001-) | or |
| 21 | (.01--- | and | .1----) | or |
| 22 | (.01--- | and | .01---) | or |
| 23 | (.1---- | and | .1----) | |

Figure 5:
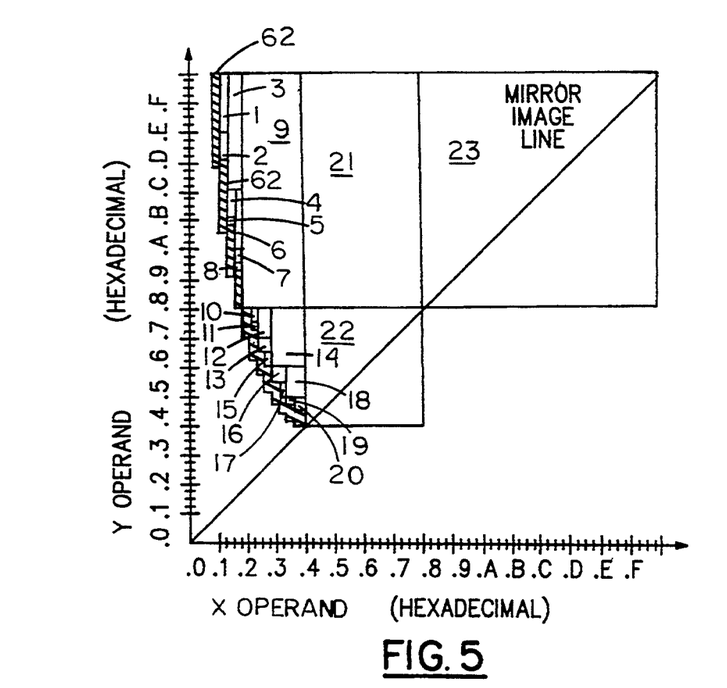

These logical equations are based on a logic map illustrated in FIG. 5. The indeterminate region 62 is still divided into the same 12 non-overlapping rectangular regions as above. The region to the right and above the indeterminate region 62, i.e. where the prediction is hexadecimal one for the SSC, is divided into 23 rectangular zones. The range of values for X and Y for each of these zones is defined by the respective condition with the foregoing set of logic.

If none of the foregoing conditions for either set of logic is satisfied, then the result is indeterminate.

It should be noted that because of the symmetry of the curve 62, the same logical equations are applicable when X and Y are interchanged. Therefore, to reduce the amount of logic circuitry within decoding logic 70, an interchange circuit 80 illustrated in FIG. 6 within the guard/prediction circuit 30 determines when the most significant bits of X are less than the most significant bits of Y. In such case, the interchange circuit 80 swaps the X and Y bits enroute to the logic circuit 70. Circuit 80 operates as follows. The first six bits of X are supplied directly to one input of a two-to-one adder 82. The first six bits of Y are supplied via an inverter 84 to the other input of adder 82. A carry bit 86 from the adder 82 indicates whether X is larger than Y. If so, then Y is passed to input 87 of decode logic 70 via AND gate 99 and OR gate 94 and X is passed to input 88 of decode logic 70 via AND gate 92 and OR gate 96. However, if X is smaller than Y, then Y is passed to input 88 via AND gate 98 and OR gate 96 and X is passed to input 87 via AND gate 90 and OR gate 94.

Figure 7:
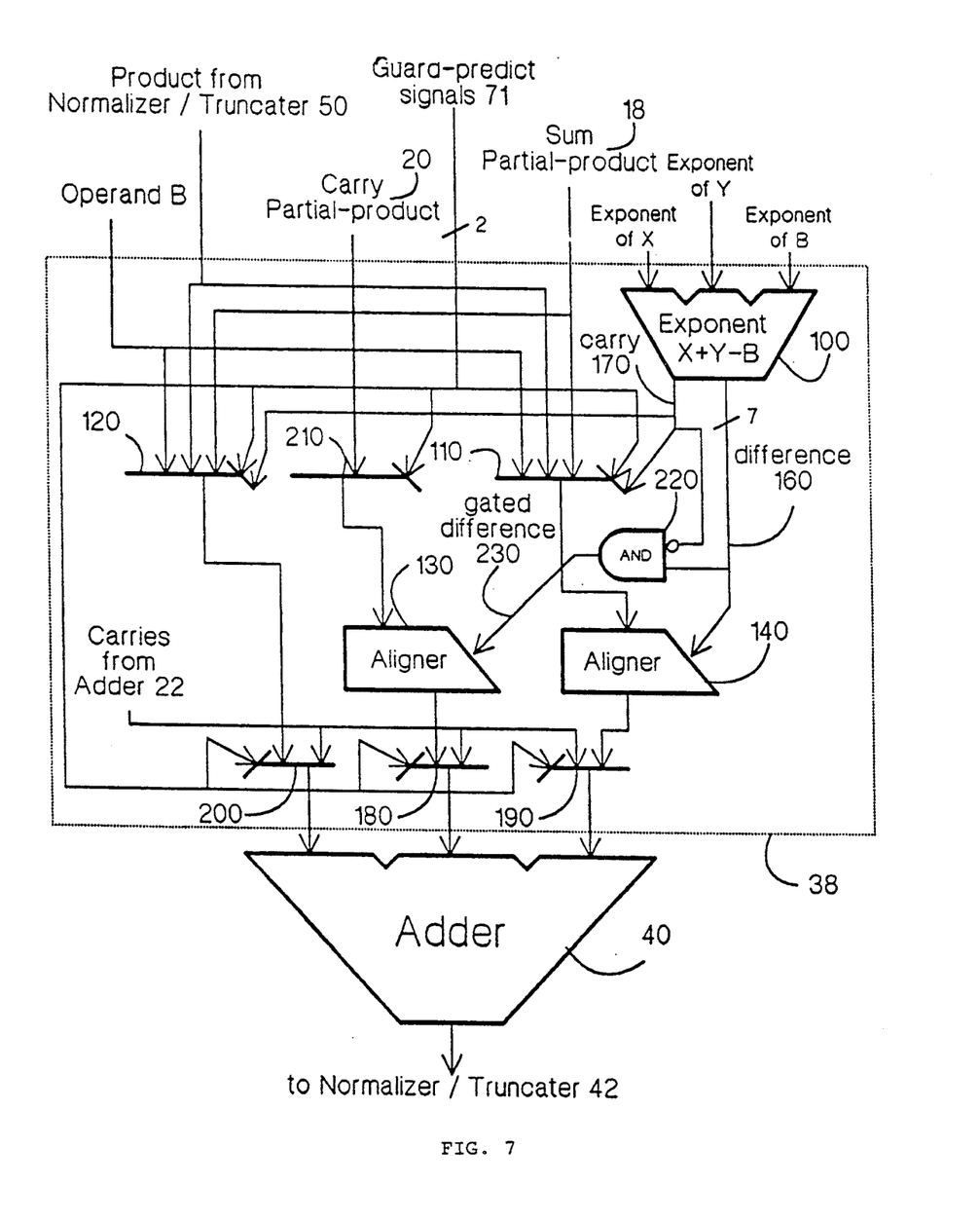
FIG. 7 is a block diagram of multiplexers, an aligner, and a three-to-one adder within the arithmetic unit of FIG. 1.

FIG. 7 illustrates the switching and alignment circuitry 38 in detail and the adder 40. Circuitry 38 includes aligners 130 and 140 for aligning the inputs to adder 40 to equalize the power of each input. Each of the aligners comprises a shifting circuit which shifts the input right in 4-bit (one hexadecimal digit) increments. Circuitry 38 also includes multiplexers 110, 120, 180, 190, 200 and 210 to select which inputs are supplied to the adder 40. Multiplexers 110 and 120 are controlled by two guard prediction signal lines 71 from the guard/prediction circuit 30 and a carry output from a three-to-one adder 100 as described below. Multiplexer 210 is controlled by the two guard prediction signal lines 71 alone. Multiplexers 200, 180 and 190 are controlled by the two guard prediction signal lines 71 alone. The guard-prediction signals 71 select whether the XY product from normalizer/truncater 50 is passed through multiplexor 110 or 120 (in the case where the MSD cannot be predicted) or whether the sum vector 18 and carry vector 20 are passed through multiplexers 110 or 120 and 210, respectively (in the case where the MSD can be predicted). In the latter case, the respective carries from adder 22 are also passed through one or more of the multiplexers 180, 190 or 200. Three-to-one adder 100 adds the exponent of X plus the exponent of Y minus the exponent of operand B. A carry output 170 indicates whether the product of X and Y (the magnitude of which depends on the addition of the exponents) will have a greater exponent than that of operand B, and if so, that alignment is required. Thus, the carry output 170 is used to control multiplexers 110 and 120 to route the sum vector 18, or operand B to the requisite aligner 140. A difference output 160 (comprising seven bits and lines) from the adder 100 is supplied to the aligners 130 and 140 to indicate how much shifting should be performed. The adder 40 is a standard three-to-one sign magnitude adder.

The actual multiplexer that passes each requisite input to adder 40 depends on which of the requisite inputs require alignment. If the prediction cannot be made and the carry 170 is one, then multiplexer 120 passes the XY product to adder 40 and multiplexer 110 passes the operand B to aligner 140 (for alignment) and then to adder 40. Thus, the operand B can be shifted right and its exponent increased a number of increments equal to $X+Y-B$. If the prediction cannot be made and the carry 170 is zero, then multiplexer 110 passes the XY product to aligner 140 (for alignment) and then to adder 40 and multiplexer 120 passes the operand B to adder 40. Thus, the XY product can be shifted right and its exponent increased a number of increments equal to $B-(X+Y)$. If the prediction can be made and the carry 170 is one, then multiplexer 110 passes the operand B to aligner 140 (for alignment) and then to adder 40, multiplexer 120 passes the sum vector 18 to adder 40 and multiplexer 210 passes the carry vector 20. Even though multiplexer 210 passes the carry vector to aligner 130, no shifting is required and aligner 130 does not shift the carry vector because of seven AND gates 220 that block the seven respective difference lines 160. The blocking occurs because each of the AND gates 220 also receives as an input the carry line 170 which is a one in this case. If the prediction can be made and the carry 170 is zero, then multiplexer 110 passes the sum vector 20 to aligner 140 (for alignment) and then to adder 40, multiplexer 120 passes the operand B to adder 40 and multiplexer 210 passes the carry vector 20 to aligner 130 (for alignment). Thus, the sum and carry vectors 20 can be shifted right a number of increments equal to $B-(X+Y)$.

The following is a description of how the carries from adder 22 are applied to the outputs of selector 120 (via selection 200), aligner 130 (via selector 180) and aligner 140 (via selector 190), as applied to the inputs to adder 40. This description assumes that the floating-point operands are of the short format, i.e., having mantissas of 24-bits in width.

For the following, assume that the B operand shifts (i.e., carry 170 is one) and that the guard-prediction circuit 30 indicates that MSD is non-zero.

```
                            bit 24 ──┐    ┌── bit 28
             bit 0 ──┐              │    │
                      v              v    v
output of selector 200    SSSSSS...c0000
output of selector 180    CCCCCC...c0000
output of selector 190    0 0 0 0 BB...BBBBB
```

As shown above, the B operand has digit shifted right by an amount equal to difference 160. The "c" applied to the bit-24 position of selector 200 and selector 180 is the carry out of digit 7 from adder 22. As applied to both selectors 200 and 180, when they are added via adder 40, they will propagate a carry into bit 23.

For the following, assume that B operand shifts (i.e., carry 170 is one) and that the guard-prediction circuit 30 indicates that MSD is zero.

```
                            bit 24 ──┐    ┌── bit 28
             bit 0 ──┐              │    │
                      v              v    v
output of selector 200    SSSSSS...SSSSc
output of selector 180    CCCCCC...CCCCc
output of selector 190    0 0 0 0 BB...BBBBB
```

As shown above, the B operand has digit-shifted right by an amount equal to difference 160. The "c" applied to the bit-28 position of selector 200 and selector 180 is the carry out of digit 8 from adder 22. As applied to both selectors 200 and 180, when they are added via adder 40, they will propagate a carry into bit 27.

For the following, assume that the sum and carry partial-products, 18 and 20 respectively, shift (i.e., carry 170 is zero). In this case, it does not matter if the guard-prediction circuit 30 indicates that MSD is zero or non-zero.

```
                            bit 24 ──┐    ┌── bit 28
             bit 0 ──┐              │    │
                      v              v    v
output of selector 200    BBBBBB...00000
output of selector 180    0 0 0 0 CC...CCCCc
output of selector 190    0 0 0 0 SS...SSSSc
```

As shown above, the sum and carry partial products (18 and 20) have digit-shifted right by an amount equal to difference 160. The "c" applied to the bit-28 position of selector 180 and selector 190 depends on the shift-amount indicated by difference 160. If the shift amount is zero, then "c" is the carry from bit 24. If the shift amount is one digit, then "c" is the carry from bit 20. If the shift amount is two digits, the "c" is the carry from bit 16, etc. As applied to both selectors 180 and 190, when they are added via adder 40, they will propagate a carry into bit 27.

Figure 8:
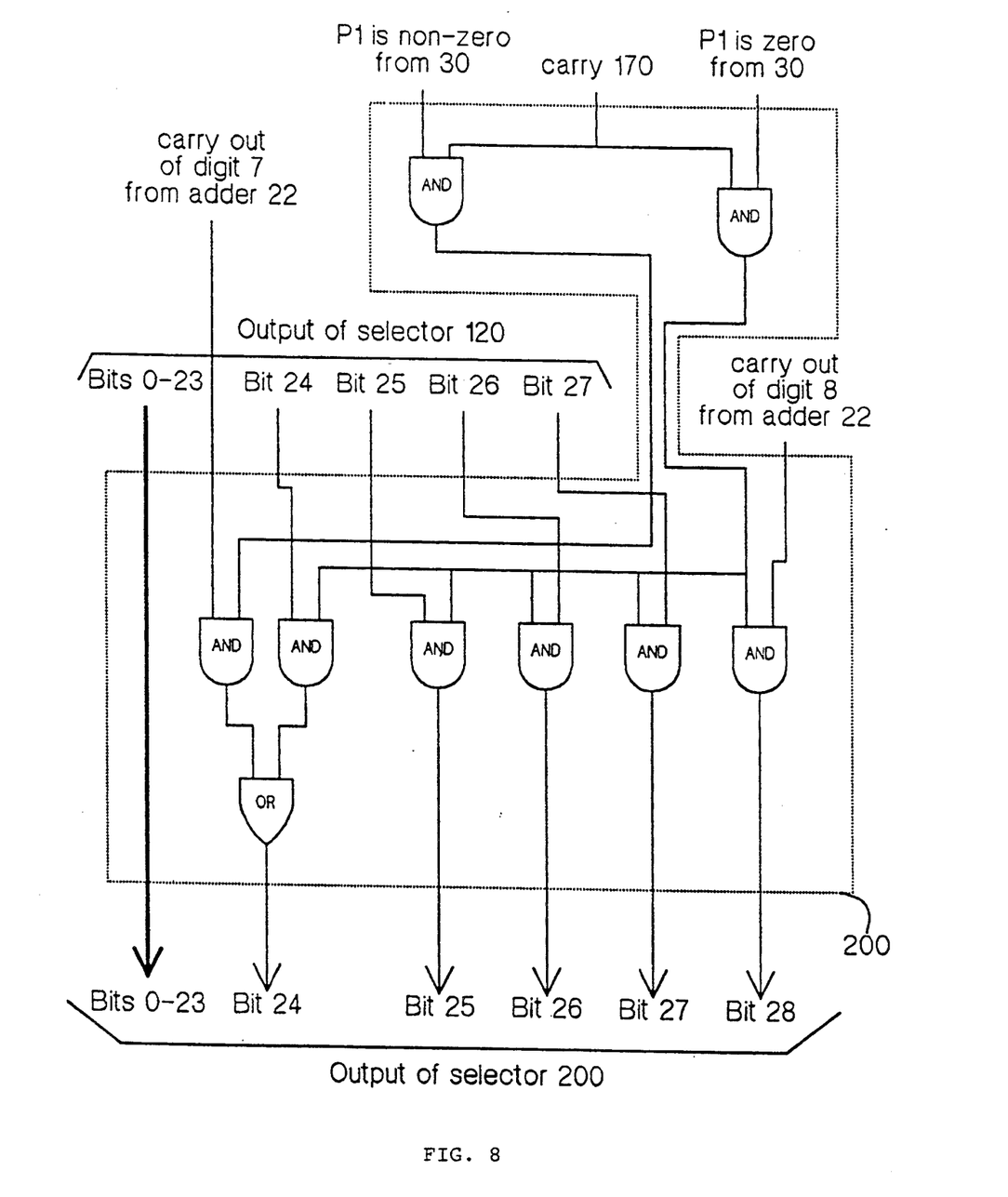
FIGS. 8–10 are detailed logic diagrams of multiplexers within the arithmetic unit of FIG. 1.
Figure 9:
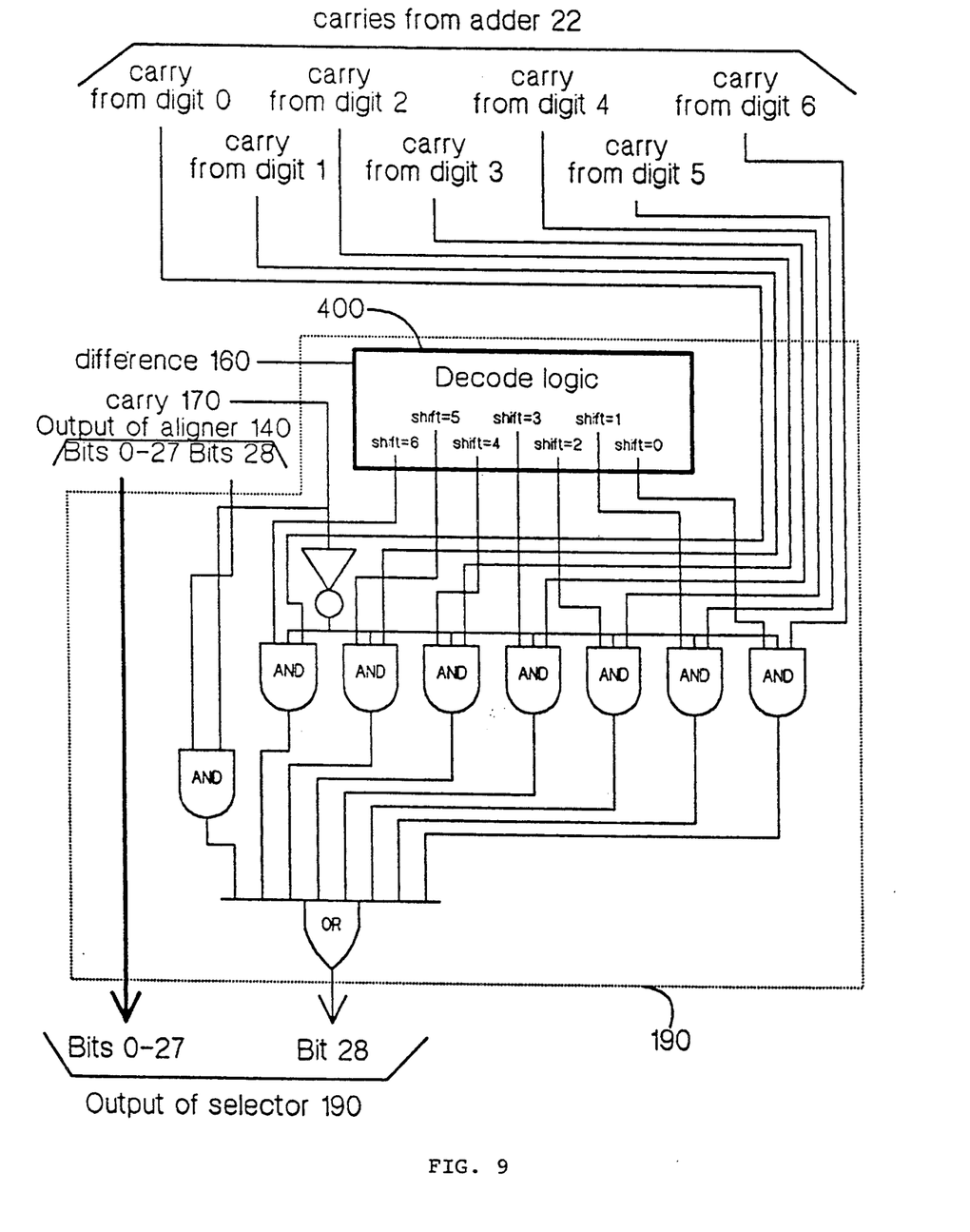
Figure 10:
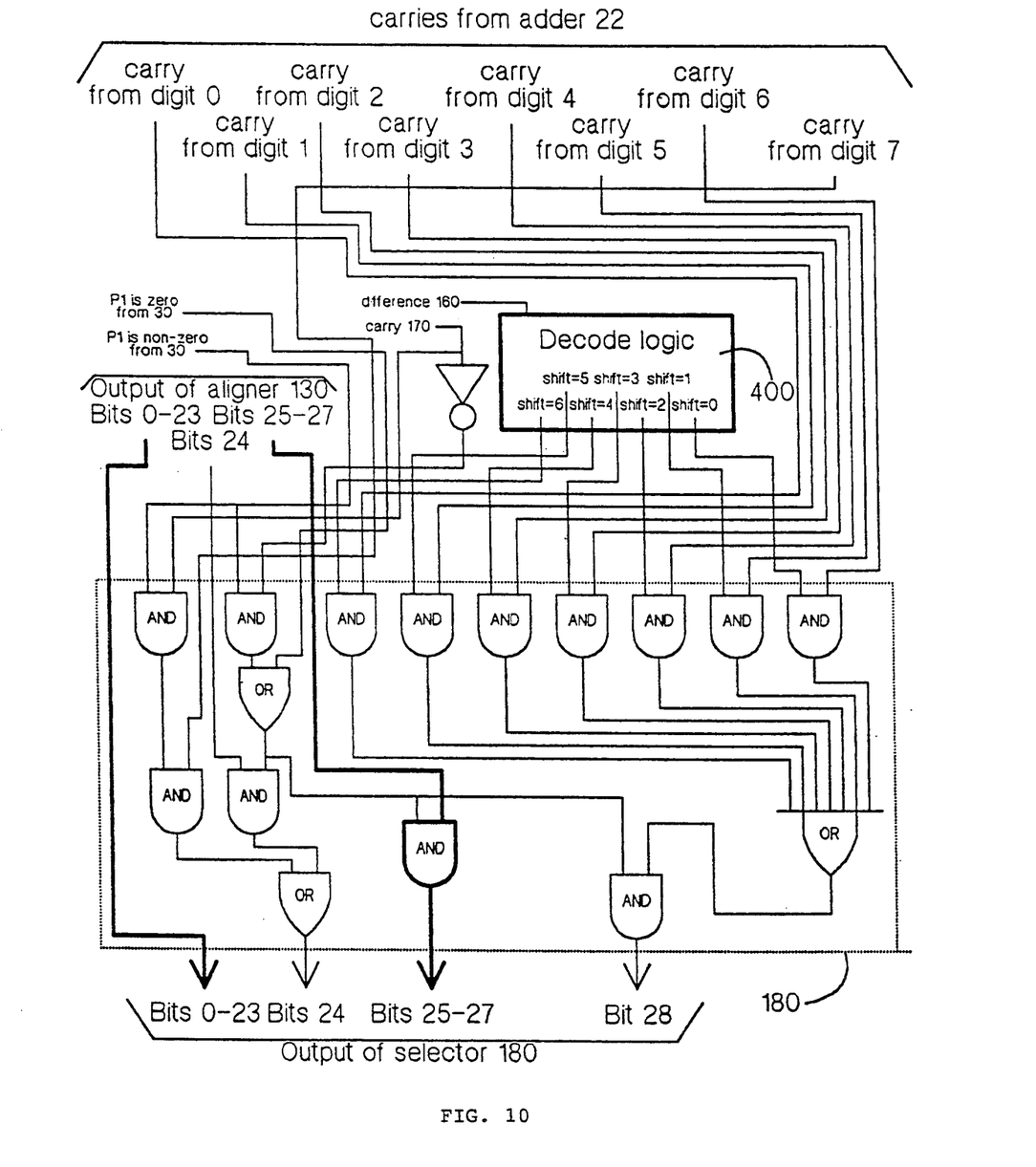
Figure 11:
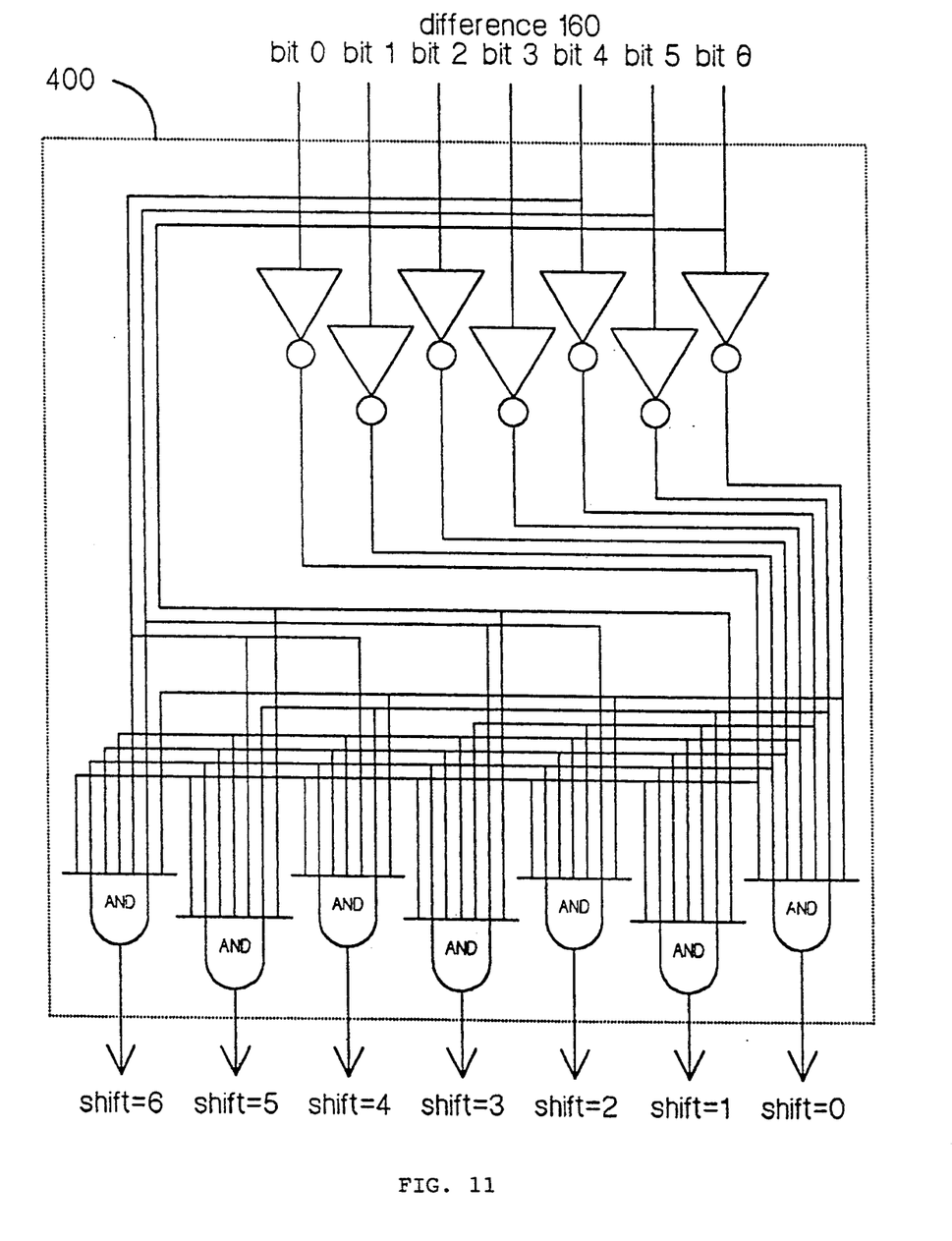
FIG. 11 is a detailed logic diagram of decode logic within the multiplexers of FIGS. 9–10.

FIGS. 8–10 illustrate the multiplexers 200, 190 and 180, respectively, in detail. The operation of the various logic gates of these multiplexers, with the specified inputs and outputs, is self explanatory. FIG. 11 illustrates decode logic 400 in detail within each of the multiplexers 200, 190 and 180. The operation of the decode logic 400, with the specified inputs and outputs, is also self explanatory.

Figure 12:
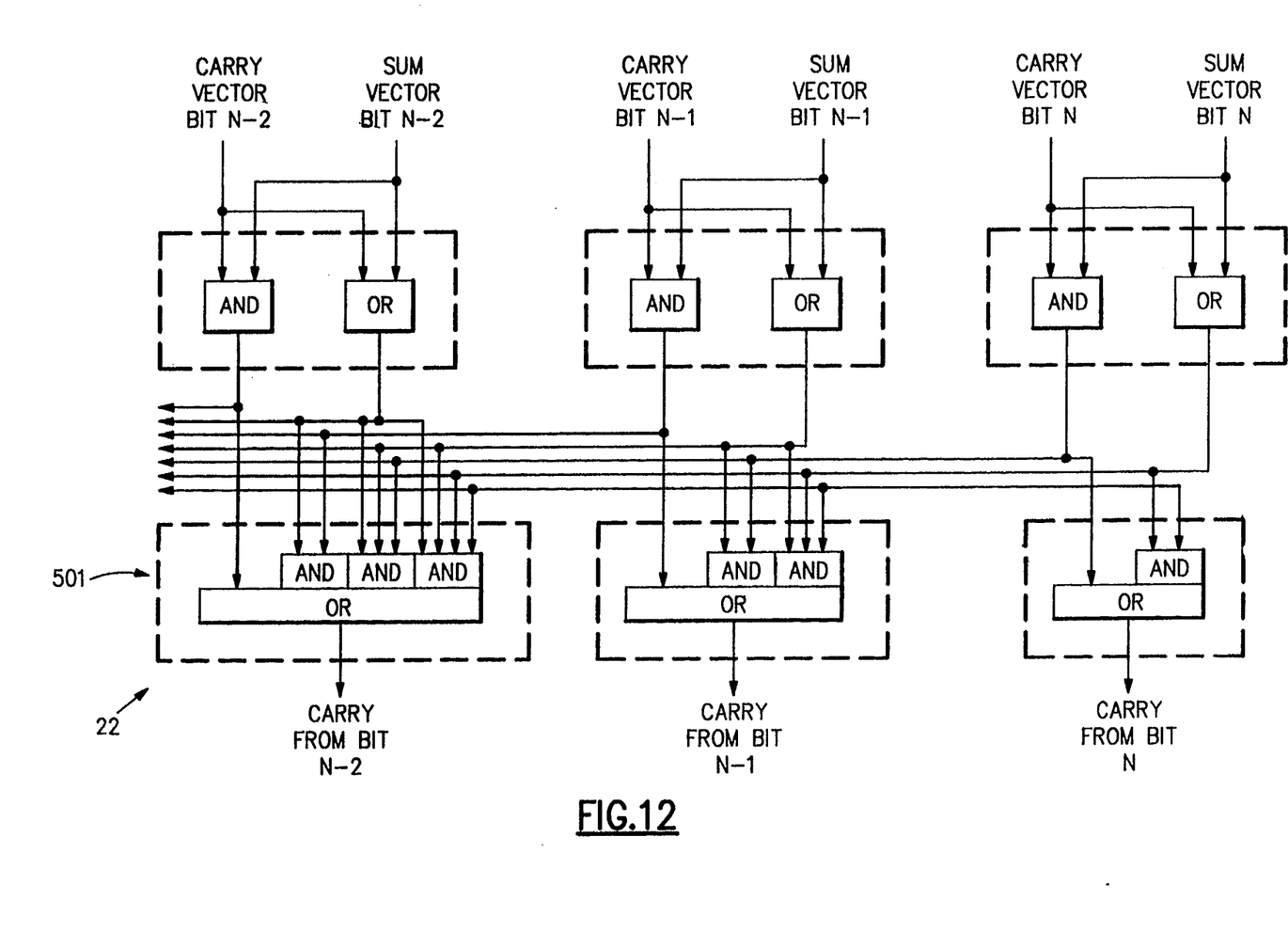
FIG. 12 is a logic diagram of the carry circuitry within the arithmetic unit of FIG. 1.

FIG. 12 illustrates the production of the carries from carry look-ahead adder 22 in great detail. Such an adder is well known in the art and described in U.S. Pat. No. 3,987,291, which patent is hereby incorporated by reference as part of the present disclosure. The carries required by adder 40 are generated by corresponding logic modules 501.

Based on the foregoing, an arithmetic unit and associated process are described according to the present invention. However, numerous modifications and substitutions can be made without deviating from the scope of the present invention. For example, multipliers and multiplicands of different length can be used with corresponding change to the "length" of the circuitry. For "long" precision, X, Y and B are each represented by 14 digits. When the MSD is nonzero, then the first 14 digits of the sum vector, the first 14 digits of the carry vector, the 15th to 14th digit carry bit from adder 22 and the operand B are passed to the adder 40. When the MSD is zero, then the first 15 digits of the sum vector, the first 15 digits of the carry vector, the 16th to 15th digit carry bit from adder 22 and the operand B are passed to the adder 40.

As another modification, a number other than six of the bits of the multiplier and multiplicand can be used by guard/prediction circuit 30 to estimate the MSD. Also, adder 40 can be used as a subtracter by simply inverting the operand B and appropriate actions taken to sign-magnitude adder 40 as known to the overt. Therefore, the invention has been disclosed by way of illustration and not limitation and reference should be made to the following claims to determine the scope of the present invention.

We claim:

1. An arithmetic unit for performing an XY +B floating point operation, comprising:
   means for producing partial products from a multiplier X and a multiplicand Y;
   first means for adding said partial products to yield a sum vector and a carry vector;
   means for determining a first carry bit resulting from addition of an (N+2)th most significant digit and lesser significant digits of said sum vector with an (N +2)th most significant digit and lesser significant digits of said carry vector, and a second carry bit resulting from addition of an (N+1)th most significant digit and lesser significant digits of said sum vector with an (N+1)th most significant digit and lesser significant digits of said carry vector;
   means, functioning while the partial product producing means produces said partial products or the partial product adding means adds said partial products, for predicting whether a most significant digit of a sum of said sum vector and said carry vector is zero and predicting whether said most significant digit of said sum of said sum vector and said carry vector is nonzero, based on most significant but not all bits of said multiplier X and said multiplicand Y; and
   second means, coupled and responsive to the predicting means, for adding
      a most significant N digits of said sum vector, a most significant N digits of said carry vector, said second carry bit and an operand B if said prediction means predicts that said most significant digit of said sum of said sum vector and said carry vector is nonzero, and
      a most significant N+1 digits of said sum vector, a most significant N+1 digits of said carry vector, said first carry bit and said operand B if said prediction means predicts that said most significant digit of said sum of said sum vector and said carry vector is zero.

2. An arithmetic unit for performing an XY +B floating point operation, comprising:
   means for producing partial products from a multiplier X and a multiplicand Y;
   first means for adding said partial products to yield a sum vector and a carry vector;
   means for determining a first carry bit resulting from addition of an (N+2)th most significant digit and lesser significant digits of said sum vector with an (N +2)th most significant digit and lesser significant digits of said carry vector, and a second carry bit resulting from addition of an (N+1)th most significant digit and lesser significant digits of said sum vector with an (N+1)th most significant digit and lesser significant digits of said carry vector;
   means, functioning while the partial product producing means produces said partial products or the partial product adding means adds said partial products, for predicting for some but not all combinations of multipliers X and multiplicands Y whether a most significant digit of a sum of said sum vector and said carry vector is certainly zero or certainly nonzero, based on most significant but not all bits of said multiplier X and said multiplicand Y; and
   second means, coupled and responsive to the predicting means, for adding
      a most significant N digits of said sum vector, a most significant N digits of said carry vector, said second carry bit, and an operand B if said prediction means predicts that said most significant digit of said sum of said sum vector and said carry vector is nonzero, and
      a most significant N+1 digits of said sum vector, a most significant N+1 digits of said carry vector, said first carry bit and said operand B if said prediction means predicts that said most significant digit of said sum of said sum vector and said carry vector is zero;
   third means for adding all digits of said sum vector and all digits of said carry vector; and wherein
   the predicting means cannot predict for some combinations of multipliers X and multiplicands Y for which the sum of the respective sum vector and carry vector is approximately equal to hexadecimal one whether the most significant digit of the sum of the sum vector and the carry vector is certainly zero or certainly nonzero, and further comprising
   means for normalizing and truncating a sum output of the third adding means and adding the normalized and truncated sum output with said operand B when the predicting means cannot predict whether the most significant digit of the sum of the sum vector and the carry vector is certainly zero or certainly nonzero.

3. An arithmetic unit as set forth in claim 2 wherein the means for adding the normalized and truncated sum output with said operand B is the second adding means.

4. An arithmetic unit as set forth in claim 1 wherein the predicting means comprises decode logic means for decoding predetermined combinations of multiplier X and multiplicand Y which indicate that the most significant digit of the sum of the sum vector and the carry vector is zero and predetermined combinations of multiplier X and multiplicand Y which indicate that the most significant digit of the sum of the sum vector and the carry vector is not equal to zero.

5. An arithmetic unit as set forth in claim 4 wherein the predicting means further comprises means for switching X and Y inputs to said decode logic means when either X is greater than Y or X is less than Y.

6. An arithmetic unit as set forth in claim 1 further comprising means for normalizing an output of the second adding means and means for truncating a plurality of least significant digits of the normalized output.

7. An arithmetic unit as set forth in claim 1 further comprising means for aligning all inputs to the second adding means.

8. A method for performing an XY+B floating point operation, said method comprising the steps of:
producing partial products from a multiplier X and a multiplicand Y;
adding said partial products to yield a sum vector and a carry vector;
determining a first carry bit resulting from addition of an (N+2)th most significant digit and lesser significant digits of said sum vector with an (N+2)th most significant digit and lesser significant digits of said carry vector, and a second carry bit resulting from addition of an (N+1)th most significant digit and lesser significant digits Of said sum vector with an (N+1)th most significant digit and lesser significant digits of said carry vector;
while the partial products are being produced or added, predicting whether a most significant digit of a sum of said sum vector and said carry vector is certainly zero or certainly nonzero, based on most significant but not all bits of said multiplier X and said multiplicand Y;
adding a most significant N digits of said sum vector, a most significant N digits of said carry vector, said second carry bit, and an operand B if said prediction is that said most significant digit of said sum of said sum vector and said carry vector is nonzero, and
adding a most significant N+1 digits of said sum vector, a most significant N+1 digits of said carry vector, said first carry bit, and said operand B if said prediction is that said most significant digit of said sum of said sum vector and said carry vector is zero.

9. A method as set forth in claim 8 wherein the predicting step cannot predict for some combinations of multipliers X and multiplicands Y for which the sum of the respective sum vector and carry vector is approximately equal to hexadecimal one whether the most significant digit of the sum of the sum vector and the carry vector is certainly zero or certainly nonzero; and further comprising the steps of completely adding said sum vector and said carry vector; and
normalizing and truncating a sum output of said complete addition of said sum vector and said carry vector and adding the normalized and truncated sum output with said operand B when the predicting step cannot predict whether the most significant digit of the sum of the sum vector and the carry vector is certainly zero or certainly nonzero.

10. A method as set forth in claim 8 wherein the predicting step comprises the step of decoding predetermined combinations of multiplier X and multiplicand Y which indicate that the most significant digit of the sum of the sum vector and the carry vector is zero and predetermined combinations of multiplier X and multiplicand Y which indicate that the most significant digit of the sum of the sum vector and the carry vector is nonzero.

11. A method as set forth in claim 10 wherein the predicting step further comprises the step of switching X and Y inputs for the decoding step when either X is greater than Y or X is less than Y.

12. A method as set forth in claim 8 further comprising the steps of normalizing a result of the adding step which is based on the prediction and truncating a plurality of least significant digits of the normalized output.

13. A method as set forth in claim 8 further comprising the step of aligning the sum vector and carry vector for the adding step which is based on the prediction.

14. An arithmetic unit for performing an XY+B floating point operation, comprising:
means for producing partial products from a multiplier X and a multiplicand Y and adding said partial products to yield a sum vector and a carry vector;
means for determining a first carry bit resulting from addition of an (N+2)th most significant digit and lesser significant digits of said sum vector with an (N +2)th most significant digit and lesser significant digits of said carry vector, and a second carry bit resulting from addition of an (N+1)th most significant digit and lesser significant digits of said sum vector with an (N+1)th most significant lesser significant digits of said carry vector;
means for determining, while the partial products are produced or added, whether a most significant digit of a sum of said sum vector and said carry vector is certainly zero or certainly nonzero, based on most significant but not all bits of said multiplier X and said multiplicand Y, and
if determined to be nonzero, adding a most significant N digits of said sum vector, a most significant N digits of said carry vector, said second carry bit, and an operand B, and
if determined to be zero, adding a most significant N+1 digits of said sum vector, a most significant N+1 digits of said carry vector, said first carry bit, and said operand B.

15. An arithmetic unit as set forth in claim 14 wherein the determining means cannot determine for some combinations of multipliers X and multiplicands Y for which the sum of the respective sum vector and carry vector is approximately equal to hexadecimal one whether the most significant digit of the sum of the sum vector and the carry vector is certainly zero or certainly nonzero; and further comprising
means, responsive to the lack of certainty of the determining means, for adding all digits of said sum vector and all digits of said carry vector, normalizing and truncating a result of said adding, and adding the normalized and truncated result with said operand B.

16. An arithmetic unit for performing an XY+B floating point operation, comprising:
means for multiplying a multiplier X and a multiplicand Y to yield a sum vector and a carry vector;
means for determining a first carry bit resulting from addition of an (N+2)th most significant digit and lesser significant digits of said sum vector with an (N +2)th most significant digit and lesser significant digits of said carry vector, and a second carry bit resulting from addition of an (N+1)th most significant digit and lesser significant digits of said sum vector with an (N+1)th most significant digit and lesser significant digits of said carry vector; means for determining, during said multiplying, whether a most significant digit of a sum of said sum vector and said carry vector is certainly zero or certainly nonzero, based on most significant but not all bits of said multiplier X and said multiplicand Y, and if determined to be nonzero, adding a most significant N digits of said sum vector, a most significant N digits of said carry vector, said second carry bit, and an operand B, and if determined to be zero, adding a most significant N+1 digits of said sum vector, a most significant N+1 digits of said carry vector, said first carry bit, and said operand B.

17. An arithmetic unit as set forth in claim 16 wherein the determining means comprises decode logic means for decoding predetermined combinations of multiplier X and multiplicand Y which indicate that the most significant digit of the sum of the sum vector and the carry vector is zero and predetermined combinations of multiplier X and multiplicand Y which indicate that the most significant digit of the sum of the sum vector and the carry vector is nonzero.

18. A method for performing an XY+B floating point operation, said method comprising the steps of:

producing partial products from a multiplier X and a multiplicand Y, and adding said partial products to yield a sum vector and a carry vector;

determining a first carry bit resulting from addition of an (N+2)th most significant digit and lesser significant digits of said sum vector with an (N+2)th most significant digit and lesser significant digits of said carry vector, and a second carry bit resulting from addition of an (N+1)th most significant and lesser significant digits of said sum vector with an (N+1)th most significant digit and lesser significant digits of said carry vector;

predicting, while the partial products are being produced or added, whether a most significant digit of a sum of said sum vector and said carry vector is certainly zero or certainly nonzero, based on most significant but not all bits of said multiplier X and said multiplicand Y, and if predicted to be nonzero, adding a most significant N digits of said sum vector, a most significant N digits of said carry vector, said second carry bit, and an operand B, and if predicted to be zero, adding a most significant N+1 digits of said sum vector, a most significant N+1 digits of said carry vector, said first carry bit, and said operand B.

19. A method as set forth in claim 18 wherein the predicting step comprises the step of decoding predetermined combinations of multiplier X and multiplicand Y which indicate that the most significant digit of the sum of the sum vector and the carry vector is certainly zero or certainly nonzero.

20. An arithmetic unit for performing an XY+B floating point operation, comprising:

means for producing partial products from a multiplier X and a multiplicand Y and adding said partial products to yield a sum vector and a carry vector; and means for determining carry bits resulting from addition of least significant but not all digits of said sum vector and least significant but not all digits of said carry vector;

means for determining, while the partial products are produced or added, for most but not all combinations of multiplier X and multiplicand Y whether a most significant digit of a sum of said sum vector and said carry vector is certainly zero or certainly nonzero, based on most significant but not all bits of said multiplier X and most significant but not all bits of said multiplicand Y, and if determined to be certainly zero or certainly nonzero, adding most significant but not all digits of said sum vector, most significant but not all digits of said carry vector, one of said carry bits corresponding to a least significant bit of said multiplier X and a least significant bit of said multiplicand Y which are being added, and an operand B.

21. An arithmetic unit as set forth in claim 20 wherein the determining means comprises decode logic means for decoding predetermined combinations of multiplier X and multiplicand Y which indicate that the most significant digit of the sum of the sum vector and the carry vector is certainly zero or certainly nonzero.

* * * * *

UNITED STATES PATENT AND TRADEMARK OFFICE
CERTIFICATE OF CORRECTION

PATENT NO. : 5,375,078
DATED : 12/20/94
INVENTOR(S) : D. Hrusecky et al

It is certified that error appears in the above-identified patent and that said Letters Patent is hereby corrected as shown below:

IN THE ABSTRACT:

Line 20, after "addition", please insert of;

please change "(N-1)th" to (N+1)th.

Signed and Sealed this

Twenty-eight Day of March, 1995

Attest:

BRUCE LEHMAN

Attesting Officer          Commissioner of Patents and Trademarks